United States Patent [19]
Collins et al.

[11] Patent Number: 4,641,316
[45] Date of Patent: Feb. 3, 1987

[54] D.C. ELECTRON BEAM METHOD AND APPARATUS FOR CONTINUOUS LASER EXCITATION

[75] Inventors: George J. Collins; Jorge J. Rocca; Jack D. Meyer, all of Ft. Collins, Colo.

[73] Assignee: Applied Electron Corp., Albuquerque, N. Mex.

[21] Appl. No.: 656,408

[22] Filed: Oct. 1, 1984

Related U.S. Application Data

[63] Continuation of Ser. No. 353,428, Mar. 1, 1982, abandoned.

[51] Int. Cl.$^4$ .............................................. H01S 3/09
[52] U.S. Cl. ...................................... 372/74; 372/76; 372/37; 372/85; 372/87
[58] Field of Search .................. 372/74, 76, 87, 88, 372/37, 56, 85, 73

[56] References Cited

U.S. PATENT DOCUMENTS
3,413,568  11/1968  Gordon et al. ........................ 372/88

FOREIGN PATENT DOCUMENTS
1064151  10/1979  Canada .................................. 372/85

OTHER PUBLICATIONS
Maitland, "A Plasma Jet as Cathode for an Argon Laser", *Brit. J. Appl. Phys.*, Ser. 2, vol. 2, 1969, pp. 535-539.
Crocker, "Pulsed Atmospheric—Pressure Carbon—Dioxide Laser Initiated by a Cold—Cathode Glow—Discharge Electron Gun", Electronics Letters, vol. 8, No. 18, Sep. 7, 1972, pp. 460-461.

*Primary Examiner*—James W. Davie

[57] ABSTRACT

A highly efficient laser employs a glow discharge electron gun and includes a solid wall cathode that emits a beam of electrons resulting in a plasma that is a negative glow discharge having an electron distribution that has a larger number of high energy electrons than would be present in a Maxwellian distribution of the same electron density.

12 Claims, 10 Drawing Figures

D.C. ELECTRON BEAM METHOD AND APPARATUS FOR CONTINUOUS LASER EXCITATION

This application is a division of application Ser. No. 353,428, filed Mar. 1, 1982, now abandoned.

BACKGROUND OF THE INVENTION

It will be understood that a Laser is an amplifier of light, and that the word laser is a coined word of the letters thereof, being "Light Amplification Stimulation of Electromagnetic Radiation."

The conventional manner of exciting CW ion lasers is to use electron collisions in the positive column region of a low pressure gas discharge.

A positive column has roughly a Maxwellian electron energy distribution with a mean electron energy of 3 to 8 electron volts (eV), depending upon pressure, current density, bore diameter and magnetic field strength. Such bore being, of a conventional laser instrument tube. However, ionization and excitation cross sections of many upper laser levels peak above 100 eV. Hence, only those energetic electrons in the tail of the Maxwell-Boltzman energy distribution are energetic enough to provide direct excitation. As a consequence, very large current densities (hundreds of $A/cm^2$) are generally required to excite noble gas ion lasers, resulting in laser operating efficiencies of $5 \times 10^{-4}$. In the case of metal vapor ion lasers, the metal impurity, when added to the discharge, drastically lowers the electron temperature of the positive column plasma. As a result, the metal vapor concentration and the electron temperature cannot be independently optimized. The electron energy characteristics of the positive column become even more undesirable for UV and VUV ion lasers where the upper laser levels are in multiply ionized species. The laser operating efficiencies for $Ar^{++}$ and $Kr^{++}$ lasers, for example, are typically $10^{-4}$. Hollow cathode ion lasers have an electron beam component in the electron distribution, but it is small and inefficiently produced and impractical as the beam component accounts for typically only 10% of the total discharge current.

Applicants have perfected electron beam plasmas of a high density of high energy electrons, created by their electron beams in a very sufficient way by their new d.c. electron guns use. Also, in this invention the parameters of the electron beam discharge are independently optimized from the density of metal vapor concentration when metal vapor is used as laser material.

BRIEF DESCRIPTION OF INVENTION

Applicants use d.c. electron beams to excite plasmas that are used as active mediums for CW lasers. The plasmas are produced either by using high voltage (0.5 kV to 50 kV) electron beams produced by glow discharge electron guns, in a longitudinal (parallel to the optical axis), or in a transverse configuration, or by using low voltage (80 V to 500 V) electron beams in a transverse configuration. The electron beam ionizes and excites a gas or a metal vapor or a mixture of both and produces a population inversion. On Applicants' high voltage electron beam excitation use, the d.c. electron beam are produced by a glow discharge, solid wall electron gun, operating at pressures between 0.05 and 5 torr in a helium atmosphere one of several gases, without the need of differential pumping. When we use longitudinal electron beam excitation, an axial magnetic field of strength of 0.5 to 5 Kgauss is used to collimate the electron beam and efficiently deposit the electron beam energy into the plasma. We also use our high voltage glow discharge electron guns in a transverse excitation configuration. In this case pairs of opposite guns maintain the beam confined to a limited volume, and in this way the electron beam energy is efficiently deposited into the laser active medium.

Another configuration Applicants use to excite CW lasers by electron beams, employs a low voltage electron beam in a transverse configuration with the electron beam traveling perpendicular to the optical axis. The low voltage electron beam in this latter case is produced by an electron gun that uses either a thermoionic emitting cathode, or a glow discharge cathode. This last configuration is particularly useful for the excitation of CW noble gas ion lasers and can increase the efficiency of these lasers due to the fact that the electron beam energy perfectly matches the peaks of the cross sections for excitation of the laser upper levels.

Aplicants have become aware of U.S. Pat. Ser. No. 3,931,589 issued on Jan. 6, 1976, to Aisenberg et al. Applicants' invention is directed to a laser employing an electron gun having a solid wall cathode as opposed to the perforated cathode taught by Aisenberg et al. As a result, applicants' electron gun is capable of producing an electron beam of much higher power and is capable of operating at much higher pressures than is that taught by Aisenberg et al.

DETAILED DESCRIPTION OF INVENTION

Figure 1:
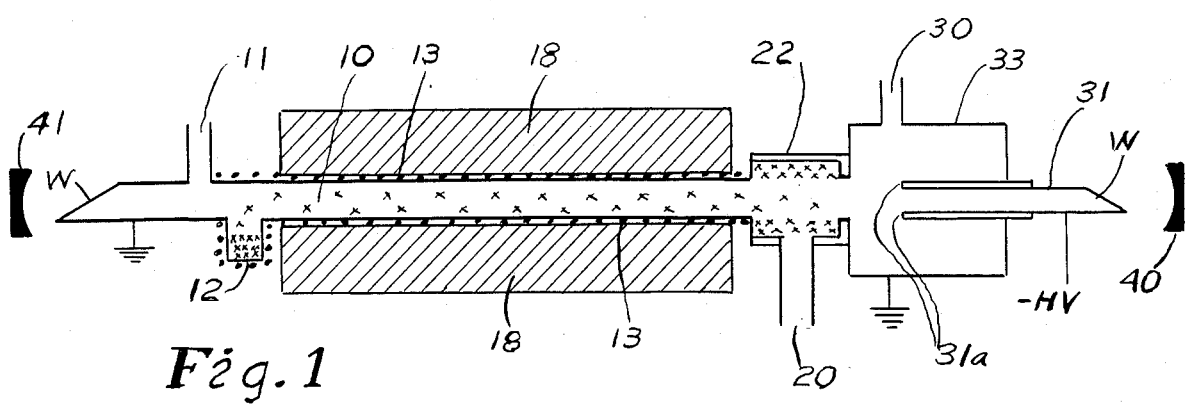
FIG. 1 is a diagram illustrating a laser that includes an electron gun constructed in accordance with the present invention.

We describe and claim three configurations, as ways to achieve our novel method of d.c. electron beam pumping of CW lasers. These are: the use of our high voltage (0.5 to 50 kV) electron beams, created by our novel glow discharge electron solid gun, used longitudinally as in FIGS. 1, 2, 3 and 4; next, by the transverse use of our said electron beams, as in FIGS. 6 and 7; and thirdly the use of low voltage (80 to 500 V) electron beams in a transverse or perpendicular configuration to the laser optical axis, as in FIGS. 8, 9 and 10. We describe four modifications of our said first or longitudinal configuration. Our said first configuration, in which a high voltage electron beam is created by our novel glow discharge solid electron gum to longitudinally excite a CW laser, we describe first, being of FIGS. 1, 2, 3 and 4.

Reference is made to the drawings, wherein like reference numbers have been used to represent like or similar parts. The reference number 10 indicates a plasma tube of a conventional laser tube instrument, and which tube we call the "ACTIVE MEDIUM", being where the active medium is produced within that tube. As an example, we discuss noble gas metal ion lasers, but our invention is not limited to that system, but includes pumping of pure noble (He, Ar, Ne, Kr) gases (i.e. helium, argon, neon, krypton), and also excitation of molecules and atoms.

The reference number 11 indicates a helium gas inlet tube, from a helium gas supply, leading into a laser plasma tube 10. While we use helium as the gas in the plasma tube 10, a variety of other gases could be used instead, such, for example, as neon. That helium gas acts as a buffer gas, and is used in conjunction with a metal vapor from a reservoir 12, as shown. We provide a supply of metal in the container 12, and we use mercury metal in that container in this example, for our electron gun beam use, with metal vapor from the mercury within the tube. We have a heater at 12 to heat that mercury metal until it vaporizes and then its vapor enters tube 10. Instead of mercury we have also proven that iodine, cadmium, selenium, zinc and arsenic will work just as well, as the vaporized metal in 10, with our electron beam use.

Applicants' d.c. electron beam excitation is a new method to pump CW lasers, and which can be used to pump ion, atomic and molecular lasers. A large variety of systems can be excited with our electron beams, as for example:

(a) With Ionic systems, and can be singly or multiple ionized, for example: In Ion lasers: of metal vapor ion lasers, such as: mercury, iodine, cadmium, selenium, zinc, arsenic, tellurium, silver, copper, aluminum and gold; of noble gas ions: argon, krypton, neon and xenon; and of other ions: (O) oxygen and (N) nitrogen;

(b) With Atomic Systems: such as He—Ne, Xe, and argon; and (c) With Molecular systems: Dimers, such as $S_2$, $Te_2$. Each of the said other metal would work very well as vapor in the active medium in the use of our electron beam, though we explain only the use of mercury as an example.

When heated in 12, the mercury vapor then rises into the tube 10, and mixes with the helium gas in that tube. The mixture of helium and mercury gases flow to the right or down the plasma tube from left to right, as illustrated. That mixture, when electronically excited, by our novel electron beam method produced by our solid gun 31, as will be explained, then is the plasma within the laser tube 10. A suitable electric heater element 13 is constructed to completely surround the entire outer plasma tube 10, so as to heat the tube and ensure that none of the mercury vapor of that helium-mercury mixture would condense on the inner walls of tube 10. Without being so heated that mercury vapor would condense, under some conditions, on the inner peripheral side of the tube 10, which would be undesirable.

Figure 2:
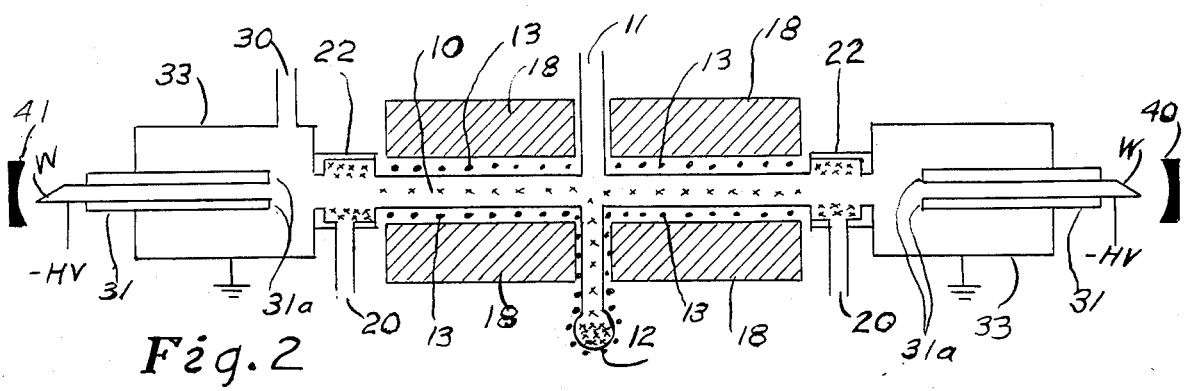
FIG. 2 is a diagram illustrating a las that includes two electron guns for doubling the power in a plasma tube.
Figure 3:
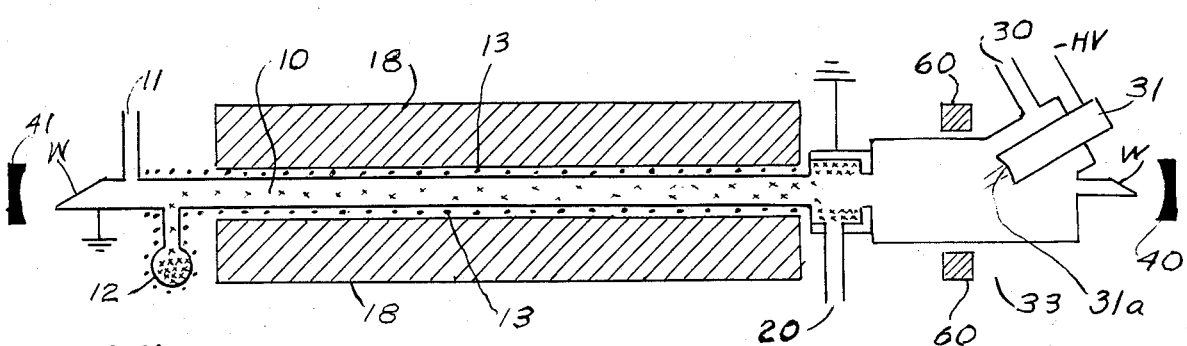
FIG. 3 is a diagram illustrating a laser that includes an electron gun positioned at an angle to the longitudinal axis of a plasma tube and that further includes a magnetic coil for deflecting an electron beam.

We provide the laser tube unit with a conventional electromagnet 18 as in our FIGS. 1, 2 and 3 completely surrounding the heater element 13 of the unit. That electromagnet 18 is a solenoid which produces an axial magnetic field. At the right of the laser unit tube 10, as illustrated, we provide a vacuum pump connection 20. The vacuum pump continuously creates a vacuum in 10, thus pulling the mixture within the tube on the inside of the tube toward the vacuum pump. The vacuum pump 20 is operated to create a vacuum in the entire tube 10 and housing 33 system. There is effected by that pump and vacuum a continuous flow of that helium-mercury gas mixture in the tube 10 toward that pump end, for example of FIG. 1, from the gas 11 entrance end. Thus ours is a flowing mixed gas system. As a result of that vacuum pump 20 operation, that pressure in the tube 10 is less than atmospheric pressure. Thus that vacuum in 10 by pump 20 attracts the mixture towards the pump 20, and causes that mixture flowing movement from left to right.

When that helium gas mercury vapor mixture within the tube 10 moves to the right, in FIGS. 1 and 3 as just explained, then the mercury metal vapor of the mixture is condensed on the inner metal trap 22 walls at the right side of the tube 10, called the metal vapor trap 22. That vapor trap housing enclosure 22 is water cooled (not illustrated), and is formed as indicated. As a result of that cooling of 22, the mercury vapor of the mixture condenses therein and stays on its walls there. The helium vapor of the mixture is pulled into the vacuum pump and can be expelled thereby into the outer atmosphere, or that helium leaving the pump can be suitably pipe connected with gas inlet 11, for reuse there. We provide a second gas intake in housing 33, as indicated at 30, of FIG. 1, a little to the right side of the vapor trap 22. Housing 33 has our novel solid electron gun 31 therein. That water cooled housing 33 has that second gas intake to permit an adjusted amount of helium gas also to enter there. Also at 30 we take in a regulated amount of oxygen supply. The oxygen assists in continuously producing the outside layer on our cathode, as will be explained. Thus around the electron gun 31, within its housing 33, there is a mixture of helium gas and oxygen. We excite the plasma of the mixture of helium and mercury vapor within the tube 10 by our novel electron gun 31, as will be explained. We operate our novel electron gun to shoot an electron beam into the active medium region in tube 10, as will be explained.

Figure 4:
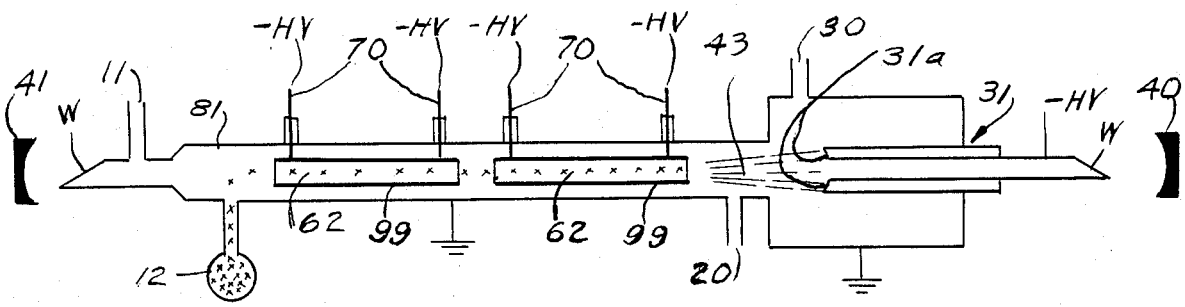
FIG. 4 is a diagram illustrating the electron gun of the present invention employed in a longitudinal hollow cathode laser.
Figure 5:
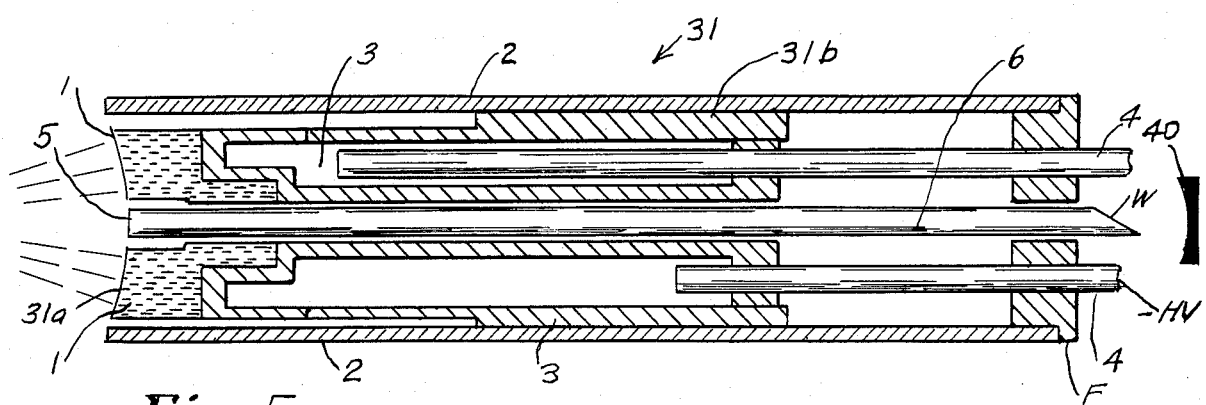
FIG. 5 is an expanded longitudinal sectional diagram of the electron gun of FIGS. 1-4.

We use our novel electron gun, 31, suitably water cooled, with that cooling as diagrammatically shown in FIG. 5. In that housing 33, of FIGS. 1-4, we have the mixture of helium and oxygen, but without any metal vapor in 33. Suitable electrical ground and negative high voltage wiring connections are supplied in each of our FIGS. 1-4 modifications, as diagrammatically shown.

Our FIGS. 1, 2, 3 and 4 laser units each have an aligned pair of dielectric mirrors at each laser tube end, with the electron beam in longitudinal alignment with the axis of the tube, in conventional manner. In each of the modifications of those FIGS. 1-4, inclusive, chamber 33, metal vapor trap 22 and plasma tube 10 are all at ground potential as they are electrically connected.

While in FIG. 1 we illustrate only one electron gun 31, in housing 33 at the right side of the tube, it is to be understood that we sometimes also use a pair of such electron guns 31, each with similar parts, with one at the left side and one at the right side of the laser tube, as shown in FIG. 2. In FIG. 2, the gun 31 at each end is in a like 33 housing, with a like extra gas inlet 30, a like metal vapor trap unit 22, and a like pump 20, as used in FIG. 1, but with the gas inlet 1 and metal vapor from 12 being centered into tube 10. In FIG. 2, the gas mixture in 10 is moved from tube 10 center toward each pump 20 at each tube 10 end, for reason previously explained re FIG. 1.

In gun 31 housing 33, we provide a gas inlet 30, wherein we bring a controlled small amount of oxygen into our electron gun housing 33 for operation of our electron gun 31. We have discovered that our said glow discharge electron gun 31 operates best in the presence of a small amount of oxygen within its housing 33, along with the presence of some helium there. Such oxygen entering at 33 does not go into the tube 10, but only creates an environment in its electron gun 33 housing, for better performance of electron beam emission at the outer 31a end face surface of our electron gun 31, according to its design, as explained, and will be further.

Our d.c. glow discharge electron solid gun 31 produces a well collimated electron beam, of an energy between 0.5 and 50 keV and a current between 50 ma and a few amperes. Our gun 31 can operate at pressures from 50 mtorr to 4 torr without the need of differential pumping. These discharge parameters make our electron gun especially suitable for pumping CW ion lasers.

We construct our electron gun face 31a, at the cathode end 1, of a material which has a high secondary electron emission coefficient due to ion bombardment. Examples of such material are aluminum with an aluminum oxide ($Al_2O_3$) surface coating and magnesium with a magnesium oxide ($Mg_2O_3$) surface coating. Insulators and oxide layers (such as aluminum oxide and magnesium oxide) usually have a much larger yield of secondary electrons per ion incident than do pure metals.

We also can use sinterized materials for the construction of the front outer face part of the cathode of our gun 31, such as aluminum-oxide with molybdenum, or magnesium-oxide with molybdenum, as explained. Of the two materials, the metal conducts the electricity and the other material, of the two so pressed and mixed elements, provides a high electron emission of our gun.

Ions coming from the electron beam sustained plasma bombard our cathode surface, of 1 outer surface 31a and produce secondary electrons. These electrons are accelerated in the cathode fall region, where most of the voltage drop in the glow discharge occurs. We shield the cathode by a ceramic, glass, quartz or metal tube 31b on all sides of 31 except its face, to restrict electron emission to the cathode front face 31a. The cathode front face 31a is formed concave, to thereby produce a well collimated self-focusing electron beam therefrom, on electron beam shooting from that face. Electron gun 31 is water cooled as shown in detail in FIG. 5, to operate at a discharge power of many kilowatts in a true d.c. way.

Our electron gun 31 provides an optical path through its tube 5, through its longitudinal axis, to permit therethrough matching of the volume of the electron beam created plasma from tube 10 with the volume of the optical resonators 40-41, as shown in FIGS. 1, 2, and 4.

We show another use of our direct current gun 31 created electron beam for CW laser excitation in FIG. 3. In this FIG. 3 our gun has no opening tube 5, and in this modification the position of our electron gun 31 is not coaxial to the plasma tube 10, as before in FIGS. 1 and 2, but is placed out of that tube axis. However the electron beam generated by our solid glow discharge electron gun 31 is still shot from 31a outer surface gun end into the plasma tube by means of deflecting the electron beam by a conventional magnetic coil 60, as shown. In this case the electron gun used does not need to have a hole through its axis face, as not necessary here for a hole to match the volume of electron beam to the plasma to the volume of the optical resonator. By placing the gun of FIG. 3 modification out of alignment with the axis of the plasma tube we provide a clear optical path between 40-41 and we match the tube plasma volume to the volume of the two tube 10 and dielectric mirrors.

We show another modification of our said electron beam use invention, by our novel glow discharge electron beam to excite CW lasers, namely, in its use with a hollow cathode discharge, as shown in FIG. 4. This works in the following way. A transverse hollow cathode discharge is established between cathode 99 and anode 81, creating a plasma 62 that can be used as laser active medium. Simultaneously, the electron beam generated 43 is shot into the plasma region. The combination of both discharges provides a plasma with a high density of energetic electrons that is used as laser active medium. This modification is preferred when metal vapor is used with helium or neon to form the laser active medium, and in the case of metal vapors with a low pressure, such as with Cu, Ag, Ag, Al, etc. In this case the cathode of the transverse hollow cathode discharge is made of the material in which we want to obtain laser action, for example Cu. In FIG. 4, 70 represents the necessary negative high voltage connections, and with each connection being also a cathode support. In this laser modification when the hollow cathode discharge is established, as explained, a metal vapor concentration is produced in the plasma region 62 by sputtering of the cathode material. In this modification there is no electromagnet required; also two electron guns 31 can be used, one at each end of the hollow cathode tube, similarly as before in FIG. 2, though only one gun is shown.

Thus in FIG. 4 Applicants have:

(a) the novel combination of a transverse hollow cathode discharge and an external glow discharge electron beam from our solid electron gun 31, to create a plasma in the hollow cathode to be used as laser active medium; and (b) in combination with a laser unit having a housing having a gas and a metal vapor therein as the active medium and a hollow cathode discharge, and our d.c. solid electron gun, the use of the hollow cathode discharges to produce metal vapor concentration in the housing by cathode sputtering in the active medium region upon electron gun 31 beam operation.

Our electron gun, of FIGS. 1, 2, 3 and 4, indicated generally as 31, is longitudinally vertically sectional detailed illustrated in FIG. 5. Our gun 31 has a solid cathode end 1, with its outer surface indicated as 31a, constructed as shown, of explained material that has a high secondary electron emission coefficient per incident ion bombarding the cathode surface. Such a cathode material is aluminum with an aluminum oxide ($Al_2O_3$) surface coating, or magnesium with a magnesium oxide ($Mg_2O_3$) as the surface coating. That oxide surface coating and not the pure metal has a high yield of secondary electrons, on gun operation. Oxide coatings and insulators have higher secondary electron emission coefficients than do pure metals. We shield our cathode 31b by a ceramic, glass, quartz, or other non-conductive material, as by tube 2, as shown, to restrict electron emission therefrom only to the cathode front being outer 31a face. The cathode front end face 31a we make concave, as shown in FIG. 5 to produce a well collimated and focused electron beam thereby therefrom, which beam emanates or is shot from that outer face only. Electron gun 31 is suitably water cooled, namely, the cathode 1 is water cooled by means of circulating water, through a provided reservoir, by copper tube 4 into said donut-like hollow reservoir 3, constructed as shown, and located around tube 5, directly contacting and behind the cathode material 1. Cathode 1 is pressed into the copper ring tubular donut water reservoir 3, for water cooling of the cathode, by heat conduction into the water. Water is circulated by a pair of copper tubes 4 leading in and out of the water reservoir 3, one tube being the water source inlet water tube and the other being the water outlet for water circulation therethrough 4. Through our solid electron gun's central axis, we insert a quartz tube 5 to insulate the wall of the axial hole of the gun. Thus we inhibit electron emission from the interior of the hole and confine that electron emission to the front face 31a only. Tube 5 also provides an optical path to permit matching the volume of the electron beam created plasma from and within tube 10 with the volume of the optical resonators 40 and 41. A negative high voltage (−HV) is electrically connected to cathode 31 through the copper water tube and outlet jacket 3 and 4 by the −HV being connected to the tube 4 as diagrammatically shown. A conventional brewster window W is attached to the end of the quartz tube 5 opposite the cathode to seal the tube. A metal end plate F is inserted as shown at the outer gun 31 tube 2 end, as a vacuum seal opposite cathode 1 end. Thus we have a solid outer end surface face, indicated as 31a, of our cathode end 1 of our gun 31, from which solid face our electron beam is emitted on gun 31 operation.

The operation of Applicants' present invention modification will now be described. Referring to our first modification, FIGS. 1, 2, 3 and 4, and to FIG. 5 detail of our said novel gun, illustrating the longitudinal beam use of our solid electron gun discharge, upon application of a high negative D.C. potential (−HV), to the gun, as explained, connected to one of its water pipes 4, and with suitable ground connection to the gun housing 33, as shown, a well collimated electron beam emanates only from that outer concave face end surface 31a of our solid electron gun 31. Those beams enter the laser tube 10, in manner and for purposes as explained.

Our electron gun, used in FIGS. 1, 2, 3 and 4, operates at pressures between 50 mtorr and 4 torr without the need of differential pumping. At applied such voltage between −0.5 and −50 kV, currents from 50 mA to a few amperes are produced. With an applied negative voltage, ions coming from the electron beam sustained plasma, in tube 10 and housing 33, (housing gun 31) bombard the gun cathode 1 surface 31a face and there is production of secondary electrons which are accelerated in the opposite direction in the cathode fall region, where most of the voltage drop occurs. Due to our cathode geometry previously discussed, a well focused energetic electron beam is produced by our novel solid gun 31 solid end outer face 31a, FIG. 4.

Our said novel electron gun and beam method to excite lasers has advantages of increased power and efficiency for exciting lasers, and also to generate laser radiation at new wavelengths.

Our electron beam method of CW laser excitation can be used with a large variety of gases and metal vapors as the active medium, for producing laser radiation at different wavelengths, as heretofore explained.

Figure 7:
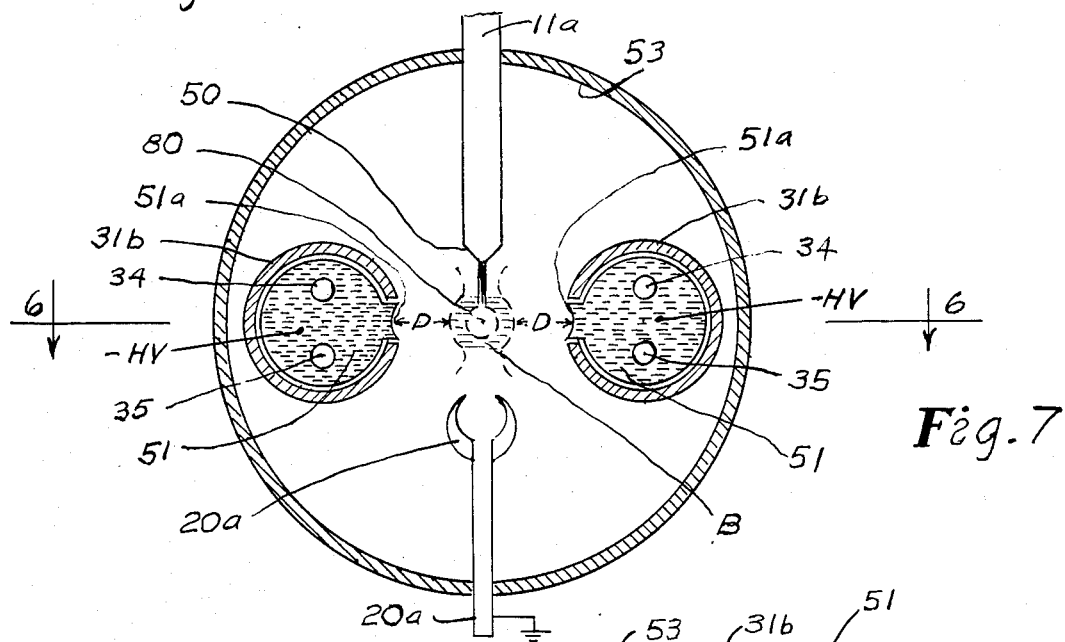
FIG. 7 is a vertical sectional diagram illustrating another embodiment of the electron gun of FIG. 6 in a CW laser tube unit.
Figure 6:
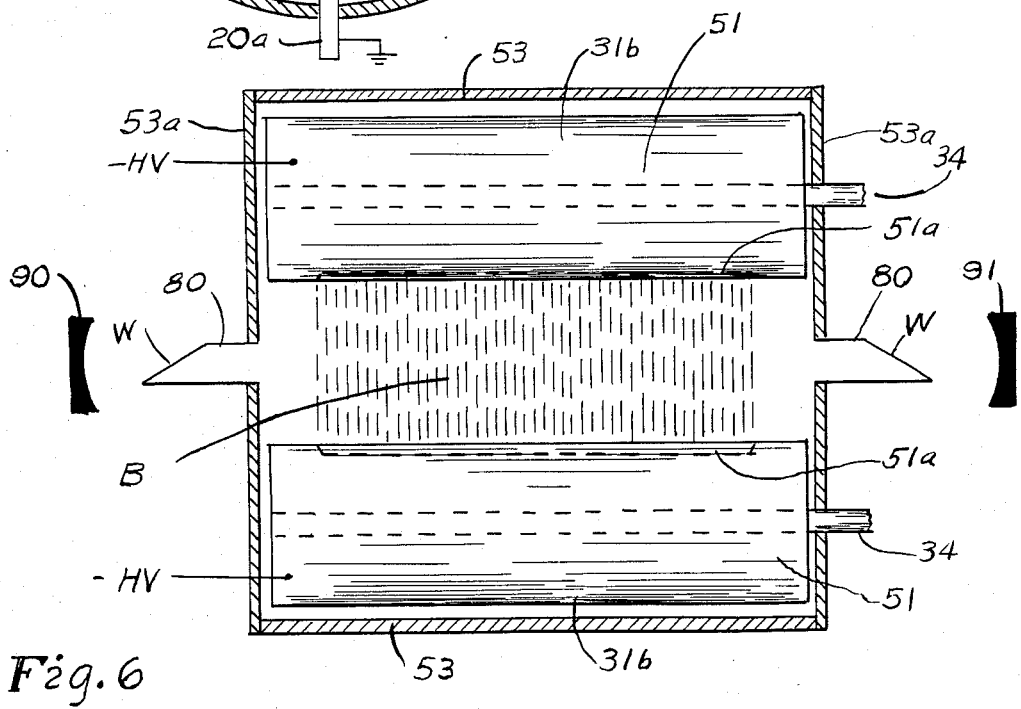
FIG. 6 is a longitudinal sectional plan diagram illustrating another embodiment of the electron gun of the present invention.

An alternative modification design, to the longitudinal excitation combination of FIGS. 1, 2, 3 and 4, is a transverse electron beam excitation scheme, as shown in FIGS. 6 and 7. In this case transverse glow discharge electron guns 51 are used, as shown diagrammatically at FIGS. 6 and 7. These two electron guns 51 generate an electron sheath of approximately 0.5 cm width and 20 to 50 cm in length. The operating voltage is lower than the one corresponding to the electron gun of FIGS. 1, 2, 3 and 4. However the fundamentals of the electron sheath generation by the transverse electron guns 51 are the same as the ones involved in the generation of the pencil form electron beam of 31 for longitudinal excitation previously described and illustrated in FIGS. 1, 2, 3 and 4. In the transverse pair of guns 51 scheme of FIGS. 6 and 7, two solid transverse electron guns 51 are placed in front of each other as shown in FIGS. 6 and 7, and each with an insulator cover and each cover having an aligned opposing longitudinal gap opening, as shown in FIG. 7. A suitable housing 53 encompasses those guns, and a helium and oxygen mixture is supplied in that housing. In this way the electrons emitted by the glow discharge electron guns 51 excite and ionize that gas mixture in the region B between the two guns. This thus excited plasma is the laser active medium. The electrons emitted by one of the guns are electrostatically "reflected" in the dark space, indicated as D, of the opposite electron gun. In this way the electron beam is partially trapped between the cathodes dark spaces D and its energy is efficiently deposited into the plasma between the guns 51 in 53. The opposing cathode configuration is an important feature of this transverse electron beam laser scheme. Suitable reflector dielectric mirrors 90-91 are provided and positioned as shown in FIG. 6. The excited laser beam thus formed leaves the housing 53 at a provided hole 80, in this FIGS. 6 and 7 modification, and bounces between aligned dielectric resonators 90-91, as shown in FIG. 6. Suitable electric ground and negative high voltage (−HV) wiring connections are provided, in this modification, as illustrated in FIGS. 6 and 7, with the anode connection being at 20a pump tube. A magnetic field could also be provided in this modification to enhance the electron beam trapping in the space between the guns. The cathodes 51 in this modification always appear in pairs, and they can be segmented and individually ballasted with resistors to improve discharge stability and provide high discharge power density deposition. For example, 10 pairs of 5 cm long cathodes could be used to create a 50 cm long plasma. Each gun 51 is made of suitable solid material with a high secondary electron emission coefficient, and has a ceramic shield 31b for reason as before. To increase said gas density in the active medium region, in the housing in the region inbetween the electron guns 51, a conventional atomic or molecular injection jet 50 is used, as diagrammatically shown in FIGS. 6 and 7, adjacent to and over the plasma B area. In this way a large or high gas density (approximately $3 \times 10^{17}$ cm$^{-3}$) can be obtained in the active medium region between those two guns, when the region close to the electron guns is at a lower pressure, so as to obtain optimum gas pressure for the electron beam efficient operation generation by the guns. To achieve this molecular or atomic gas density, the jet nozzle 50 is used and the gas is introduced thereby, to form a mixture of gas and metal vapor, in B from nozzle 11a, when a metal vapor is used for mixture with the gas. Opposite to this nozzle, in FIG. 7, a metal vapor trap 20a in housing 53 is connected to a suitable vacuum pump, in this modification. As before, a continuous vacuum in 53 is maintained by the vacuum pump at 20a, for causing less than atmospheric pressure always in housing 53.

Figure 8:
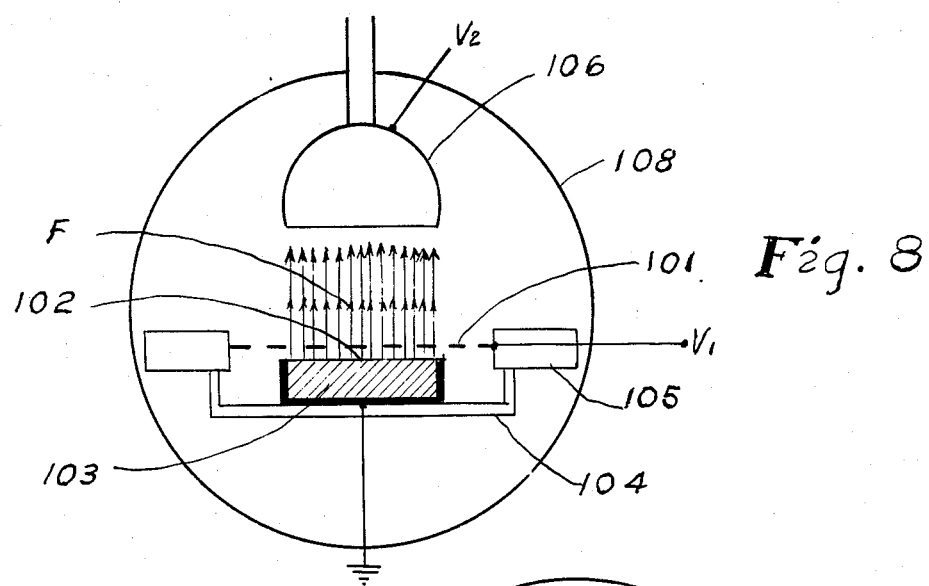
FIGS. 8, 9, and 10 are diagrams illustrating an electron beam travelling perpendicularly to the optical axis of a laser tube.
Figure 9:
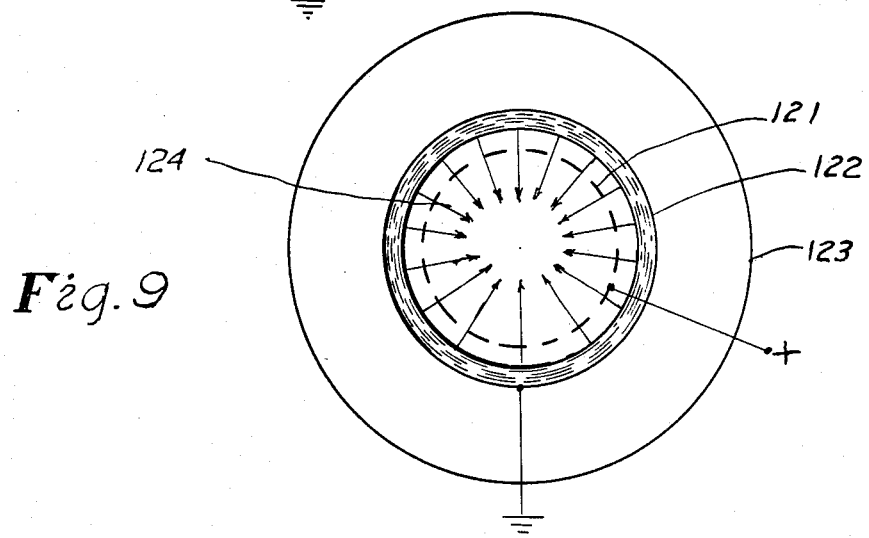
Figure 10:
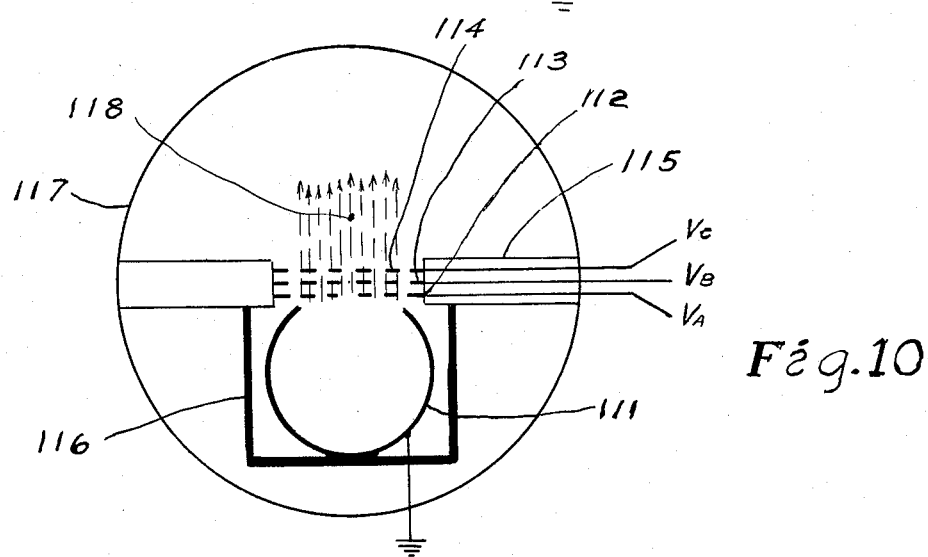

Applicants have another electron beam method of CW laser excitation, within the teaching of our invention, illustrated in FIGS. 8, 9 and 10, being a low voltage excitation of noble gas ion lasers. We use a low voltage (80 to 500 V) electron beam, with the beam produced by a low voltage glow discharge gun or a gun with a thermoionic cathode. By this scheme, we can increase the efficiency and power of noble gas ion lasers in the visible and ultraviolet parts of the spectrum. We have a low voltage transverse electron beam laser, using the thermoionic emitting cathode of a planar cathode, shown in end view, diagrammatically in FIG. 8. We use two ways to produce this low voltage transverse electron beam for the excitation of CW ion lasers. The first one, diagrammatically shown as FIG. 8, consists in using a hot cathode (dispenser or oxide coated cathode) and an anode accelerating grid. The hot cathode can be either directly or indirectly heated to the necessary temperature to achieve high electron emission (900° to 1150° C. for the case of dispenser cathodes). The cathode emits only from the surface facing the accelerating grid. Emission from all other of the cathode surfaces is inhibited. This electron gun is placed in a container, previously evacuated, and filled with a noble gas at a pressure between 0.05 and 4 torr. The accelerating grid is placed very close to the emitting cathode surface (approximately 0.5 mm) and biased to a voltage between 80 and 500 volts positive respect to the cathode. Electrons emitted from the hot cathode suffer a negligible amount of collisions before arriving to the anode, and on the way they are able to gain on energy equal to $eV_c$ where e is the electron charge and $V_c$ the voltage difference between the cathode and the anode. In this way we cause an electron beam to ionize and excite a noble gas (argon as an example) and cause a plasma in which a population inversion is achieved. Thus, this plasma is used as active medium for CW ion lasers. The discharge, indicated as F, is transverse, that is, the electrons are emitted and accelerated perpendicular to the axis of the plasma. The axis of the plasma is also the optical axis, and two dielectric mirrors (not shown) are used to conform an optical resonator, as before. One of these mirrors is a total reflector at the wavelength at which laser action wants to be achieved (example in argon at 4765 Å, 4880 Å, 4965 Å, 5145 Å, etc.). The other mirror is a partial reflector at these wavelengths.

FIG. 8 pictorially illustrates a low voltage hot cathode electron gun, for producing electron beams, having: an anode perforated electrode as 101; an emitting cathode surface as 102; side surfaces, of the flat cathode in which emission has been quenched, as 103; a cathode support as 104; an anode support as 105; an electrode as 106 at cathode potential (with same voltage as at 102); an electron beam and electron beam created plasma as F; and a vacuum housing as 108. Electrical connection to cathode and anode are not fully shown, for simplicity, as will be understood. The anode is biased 80 to 500 V positive respectively to the cathode, with optimum operation at approximately 150 V. The electrical connection to the perforated anode 101 is diagrammatically shown with V1 as 80 to 500 V with respect to the cathode, V2 is a potential negative with respect to V1 and close to cathode potential, but could be ground.

A low voltage electron beam pump laser can also be produced by using a low voltage glow discharge electron gun, as diagrammatically illustrated, as end view FIG. 10. A horseshoe hollow cathode constitutes the cathode of the glow discharge. In this case the electrons of the glow discharge are extracted from that glow by a voltage (VB) applied to an extraction grid and are accelerated by a potential (VC) applied to an accelerating grid. These grids are at a distance of approximately 0.5 mm from each other. The electron passing through the accelerating grid (biased to 80 to 500 volts positive respect to the cathode) constitutes the transverse electron beam that is used to excite the plasma in the housing and that constitutes the laser active medium. This is diagrammatically illustrated in FIG. 10, which is of an end view of a low voltage electron beam pump laser using a glow discharge electron gun. This modification, of FIG. 10, has: a cathode as 111; an anode grid as 112; an extraction grid as 113; an acceleration grid as 114; a grid support as 115; a cathode support as 116; a vacuum envelope housing as 117; and an electron beam and electron beam created plasma indicated as 118. The extraction grid separates the hollow cathode discharge from the acceleration region. Its potential (VB) controls the current extracted from the hollow cathode discharge. The hollow cathode discharge is produced between cathode 111 and anode 115, and is the source of electrons in this modification.

The transverse electron beam, by our electron gun modification of FIG. 9, as diagrammatically shown, and the thereby created electron beam and plasmas, in the laser housing of active medium mixture, are typically 10 to 50 cm long, but also could be longer, up to 150 cm in the case of large devices, designed to provide high laser powers. The plasmas created with these transverse low voltage electron beams, by our novel electron gun there illustrated, have a large density of energetic electrons that very efficiently excite the laser upper levels resulting in noble gas ion laser of increased efficiency.

A design for our glow discharge low voltage electron gun is illustrated in FIG. 8, however, we want to make clear that also other electrode configurations can be used, as the one in this FIG. 8 is an example. A diagram of two possible designs for the low voltage hot cathode electron beam electron guns are diagrammatically shown in FIGS. 8 and 9. FIG. 9 is a diagrammatic end view of another of our modified low voltage transverse electron beam plasma method, using the thermoionic emitting surface of a cylindrical cathode electron gun. This is also a low voltage hot cathode electron gun producing electron beams, as shown. Instead of a flat cathode we here use a round cylindrical one. This one has: as anode perforated electrode as 121; a cathode 122 (the internal surface is the emitting surface); a vacuum housing envelope as 123; and the produced electron beam and electron beam created plasma, which is the laser active medium, illustrated as 124.

Other and further modifications can be used of our novel electron beam laser excitation method combination, with our novel electron guns producing the electron beams, as hereinbefore taught and explained.

Our solid electron gun, referring to FIGS. 1–9, first hereinbefore explained, produces a high density of high energy electrons, created in our efficient way. The parameters of our electron beam discharge we can independently optimize from the density of the metal vapor concentration, in the active medium within the laser chamber, in the case of metal vapors. Thus, we have novel distinct advantage, among others, over the prior art, of positive column and hollow cathode lasers, with our novel d.c. solid electron gun and its novel electron beam therefrom, in our laser pumping scheme combinations, as explained, resulting in: a much more powerful and efficient resultant CW ion laser than ever before.

Our novel d.c. electron beam excitation scheme, is a new method to pump CW lasers that can be used to pump ionic systems, which can be singly or multiple ionized, or atomic or molecular lasers. A large variety of such systems can be accomplished, as are hereby taught by us, to accomplish such excitation in lasers.

Thus Applicants' preferred novel d.c. solid electron guns producing electron beams provide a new way of exciting CW lasers. Our solid novel electron gun produced electron beams are either longitudinal, transverse or perpendicular to the laser tube optical axis having the active medium and as laser pumping method, among others. Our electron solid gun discharge provides large densities of energetic electrons created in a novel efficient way.

What we claim and desire to secure by Letters Patent is:

1. A laser comprising, in combination:
    a single enclosure having an optical axis that is defined by a resonant cavity comprising two mirrors, one at each end thereof, one or both of which is employed to extract power from the laser, the single enclosure being filled with a suitable gas laser medium and being electrically connected to a source of ground potential;
    a glow discharge electron gun contained within said single enclosure and having a solid wall cathode, said solid wall cathode having one or more faces emitting beam electrons, said one or more faces emitting beam electrons being constructed of a high secondary electron emission coefficient material for producing a large number of secondary electrons per incident bombarding ion, said glow discharge electron gun being coupled to receive a source of operating voltage sufficient to cause emission of beam electrons therefrom and being physically positioned to inject those beam electrons into the gas laser medium within the single enclosure, thereby exciting the gas laser medium to become a plasma volume for employment as a laser active medium; and
    means for producing a magnetic field for confining said beam electrons.

2. A laser as in claim 1, wherein said one or more faces emitting beam electrons are formed to be geometrically concave such that the emitted beam electrons are electrostatically focussed.

3. A laser as in claim 1, wherein the means for producing a magnetic field is positioned outside the enclosure and is operative for producing magnetic field lines that are parallel to the direction of propagation of the beam electrons such that the beam electrons and the resulting plasma volume are confined.

4. A laser as in claim 1, wherein the gas laser medium comprises a mixture of two or more gases, one of said two or more gases being a noble gas.

5. A laser as in claim 2, further comprising shield means formed to surround the cathode except for said one or more faces emitting beam electrons.

6. A laser as in claim 1, wherein said glow discharge electron gun includes an axial opening, said glow discharge electron gun being positioned such that said axial opening is coaxial with the optical axis of the enclosure for allowing an unobstructed optical path between the two mirrors.

7. A laser as in claim 6, further comprising a shielding material lining said axial opening of said glow discharge electron gun.

8. A laser as in claim 1, wherein the glow discharge electron gun is positioned outside the optical axis of the enclosure, said laser further comprising magnetic means for deflecting the electron beam to be colinear with said optical axis.

9. A laser as in claim 6, wherein said glow discharge electron gun is positioned adjacent one end of said enclosure, said laser further comprising a second glow discharge electron gun positioned adjacent the opposite end of said enclosure, said second glow discharge electron gun also having an axial opening and being positioned in axial alignment with said first mentioned glow discharge electron gun.

10. A laser as in claim 1, further comprising metal vapor trap means positioned adjacent said glow discharge electron gun for collecting metal vapor.

11. A method for employing a direct current electron beam to excite a continuous wave laser, the method comprising the steps of:
    introducing a gas-vapor mixture into an evacuated chamber;
    producing a direct current beam of high energy electrons using a glow discharge electron gun located within said evacuated chamber; and
    exciting the gas-vapor mixture with said direct current beam of high energy electron to create a negative glow discharge plasma volume having an electron distribution that has a larger number of high energy electrons than a Maxwellian distribution of the same electron density for employment as a laser active medium.

12. A method for employing a direct current electron beam to excite a continuous wave laser, the method comprising the steps of:
    introducing a single gas into an evacuated chamber;
    producing a direct current beam of high energy electrons using a glow discharge electron gun located within said evacuated chamber; and
    exciting the single gas with said direct current beam of high energy electrons to create a negative glow discharge plasma volume having an electron distribution that has a larger number of high energy electrons than a Maxwellian distribution of the same electron density for employment as a laser active medium.

* * * * *